(12) United States Patent
Mizutani et al.

(10) Patent No.: US 6,210,782 B1
(45) Date of Patent: Apr. 3, 2001

(54) GLITTER RESIN MOLDED MATERIAL

(75) Inventors: Haruyasu Mizutani; Junji Koizumi; Katsushi Ito; Jiro Asano, all of Aichi-ken; Takuo Yamauchi, Saitama-ken; Mitsuhiro Isomichi, Osaka-fu, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/094,570

(22) Filed: Jun. 15, 1998

(30) Foreign Application Priority Data

Jun. 13, 1997 (JP) ...................................... 9-173021

(51) Int. Cl.⁷ ...................................... B32B 7/02
(52) U.S. Cl. .................. 428/212; 428/515; 428/911; 428/323
(58) Field of Search ..................................... 428/323, 324, 428/328, 330, 331, 515, 516, 518, 523, 911, 913, 212, 325

(56) References Cited

U.S. PATENT DOCUMENTS 5,800,912 * 9/1998 Ogiso et al. ...................... 428/323

FOREIGN PATENT DOCUMENTS 58-37045  4/1983  (JP) .

* cited by examiner

*Primary Examiner*—Bruce H. Hess
*Assistant Examiner*—B. Shewareged
(74) *Attorney, Agent, or Firm*—Pillsbury Winthrop LLP

(57) ABSTRACT

A glitter resin molded material provided having a glitter feel which is equivalent of a coated material. This glitter resin molded material comprises a skin layer molded to a surface of a core layer wherein the core layer contains a color pigment and a synthetic resin and the skin layer contains a glitter material, color pigment and a synthetic resin. The skin layer has a value of CR (Contrast Ratio) of less than 99% therein.

17 Claims, 5 Drawing Sheets

GLITTER RESIN MOLDED MATERIAL

BACKGROUND OF THE INVENTION

1. Field of the Invention

The present invention relates to a resin molded material used for a side molding of an automobile, most particularly to a glitter resin molded material having metallic luster.

2. Description of the Related Arts

For producing a side molding for mounting to, for example, a side of an automobile, a coating treatment has conventionally been used in which a surface of a resin molded material, of, for example, a side molding, is coated with a coating material having metallic luster.

It was suggested to mold the metallic luster in the resin molded material itself to avoid the coating process for the purpose of improvement of reproducibility and rationalization of the production process. In the production of a resin molded material having metallic luster, the surface of a core layer was coated with a skin layer including a pigment component and a glitter material. The pigment component and the glitter material were suitably selected and used in accordance with an intended color tone.

However, it has been difficult for the above conventional glitter resin molded material to provide the metallic luster and glitter feel that are equivalent to that of coated materials.

Therefore, it has been suggested that the color tone of the molded article would be improved by adjusting the composition of the pigment component and the glitter material included in the skin layer. In particular, adjustment of the particle size and the amount of the glitter material and a surface treatment performed by resin coating or an inorganic metallic oxide or the like have been suggested as examples.

However, the metallic luster and the glitter feel have not yet been obtained to the same extent as with the coating.

SUMMARY OF THE INVENTION

In view of the foregoing, it is therefore an object of the present invention to provide a glitter resin molded material which has a glitter feel that is equivalent to that of a coated material.

The present invention provides a glitter resin molded material comprising a skin layer coating a surface of a core layer, wherein the core layer contains a color pigment and a synthetic resin and the skin layer contains a glitter material, a color pigment and a synthetic resin, and wherein the skin layer has a Contrast Ratio value (hereinafter referred to as CR) of less than 99%.

In this invention, a CR value means an index representing transparency of the skin layer. As the CR value becomes smaller, the transparency of the skin layer becomes higher and as the CR value becomes greater, the transparency of the skin layer becomes lower.

In this invention, the CR value of the skin layer is set to be smaller than 99%.

Thus, a transparency can be imparted to the skin layer and the color of an interior core layer can be seen on the surface of the glitter resin molded material.

Namely, the metallic luster and color depth of the skin layer itself are improved by imparting transparency to the skin layer. Moreover, a color tone with high gloss, glitter and deep feel can be achieved by the glitter resin molded material wherein light transmits through the skin layer and is then reflected by the surface of the core layer which is colored with a coloring pigment.

Further, a glitter material becomes shiny when it receives light incident on the skin layer and/or light reflected by the core layer. Thus, a color tone with high luster, glitter and a deep feeling of the skin layer having the above transparency can be further reinforced.

The CR value of the skin layer is preferably less than 95%. With this value, the color of the internal core layer can be effectively presented on the surface of the glitter resin molded material. A CR value of the skin layer is preferably no lower than 0.1% and is desirably 20%. Thus, the colors for the skin layer and the core layer can be harmonized.

The resin molded material has a two-layer structure formed of the core layer and skin layer. Impact resistance and rigidity are provided to the resin molded material by the core layer, and decorative effects and durability are imparted thereto by the skin layer.

As aforementioned, in accordance with the present invention, it is possible to provide a glitter resin molded material having glitter feel equivalent to that of a coated material, having a deep and quality appearance, an excellent lustrous feeling and excellent strength and durability.

DETAILED DESCRIPTION OF THE INVENTION

Figure 1:
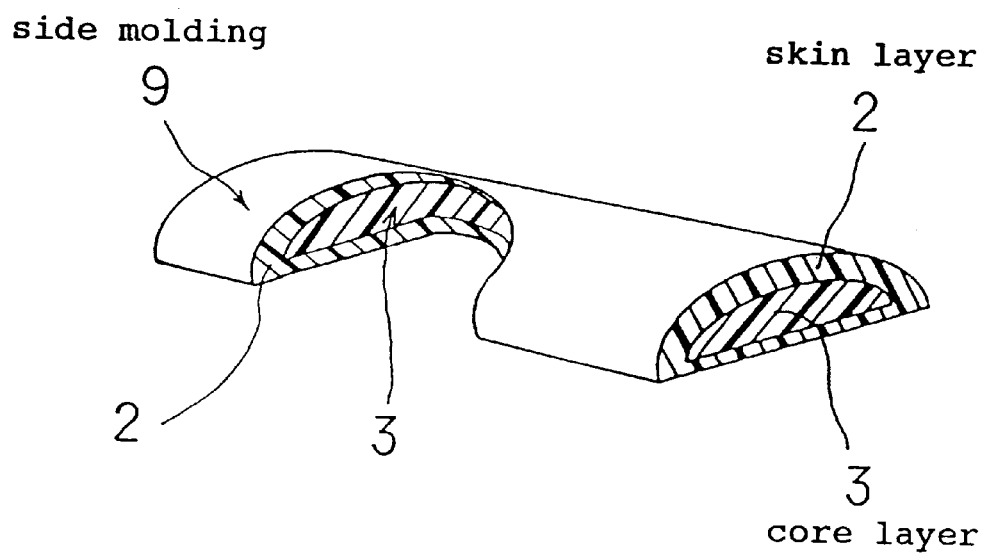
FIG. 1 is a perspective view of a side molding according to the Examples.

A measuring method of the CR value of a skin layer will now be explained.

A sheet formed of only the skin layer is molded and the color of the surface thereof is measured in the manner described below.

A standard plate A corresponding to N2.0 (black) in a brightness scale of JIS(Japanese Industrial Standard)-Z-8721 and a standard plate B corresponding to N9.5 (white) in a brightness scale of JIS-Z-8721 are prepared.

A sheet formed of only the skin layer is molded and the color of the surface thereof is measured in the manner described below. The above standard plates A and B are adhered to a back surface of the sheet and the color of a surface thereof is measured by means of a spectrophotometer of "JIS-Z-8722". The color of the object is measured by using a D65 light source in a condition C(d-8) in a visual field of ten degrees.

A CR value is calculated from the results of the measurement by the following formula using a Y-value among three stimulus values of the object color based on "JIS-Z-8701".

$$CR(\%)=[(Y\text{-value on standard plate A})/(Y\text{-value on standard plate B})]\times 100.$$

According to the method of measurement described above, it was shown that a transparency of the skin layer was increased when the CR-value was small, whereas the transparency of the skin layer was reduced when the CR value was large. Further, the skin layer was perfectly transparent when the CR value was 0% and the skin layer was perfectly opaque when the CR value was 100%.

A color difference $\Delta E^*$ between the skin layer and the core layer is preferably set to be about 10 or less. In this case, a color tone of the entire resin molded material is harmonized and the difference between the skin layer and the core layer is not conspicuous. Therefore, the impression of a glitter material contained in the skin layer becomes greater. Accordingly, an excellent glitter feeling is exhibited.

The above color difference $\Delta E^*$ is further preferably set to be 5 or less. When the $\Delta E^*$ is 5 or less, no further difference between the skin layer and the core layer is conspicuous and an even greater glitter feeling is seen.

The glitter material provides bright, lustrous and glitter feelings to the resin molded material by reflecting part or all of the irradiated light from the glitter material.

It is particularly preferable that the glitter material transmits a visible ray therethrough. In particular, it is preferable that the glitter material has a light transmittance from about 1 to about 99% with respect to the visible ray. With this transmittance, the long and deep feelings are provided to the exterior appearance of the resin molded material, giving a glitter and a highly graded impression thereon.

On the other hand, when the light transmittance of the glitter material is smaller than about 1%, reflectivity of the glitter material may be increased and the glitter material appears to be isolated in the skin layer and a glaring rough feel is observed, which degrades the appearance quality. When the light transmittance of the glitter material exceeds about 99%, the reflecting light may be reduced, resulting in a low glitter appearance.

The above color difference $\Delta E^*$, for example, is measured by "Measuring Method of an Object Color" provided for by JIS-Z-8722 and has a value calculated by "Color Difference Displaying Method" provided for by JIS-Z-8730.

The thickness of the skin layer is preferably in the range of about 0.1 to about 2 mm. This leads to an advantage of providing the decorative effect and durability to the resin molded material. Further, a sufficient amount of the glitter material can be added to the skin layer to attain the glitter, and the amount of costly glitter material can be reduced.

On the other hand, when the thickness of the skin layer is less than about 0.1 mm, the decorative effect and durability thereof may be degraded. When this thickness is more than about 2 mm, a greater amount of the expensive glitter material may be required, resulting in increased production costs.

Since the resin molded material comprises a two-layer structure formed of a skin layer and a core layer, the resin molded material provides impact resistance and rigidity because of the core layer, and decorative effects and durability because of the skin layer. Therefore, the glitter resin molded material of the present invention is excellent in strength and appearance.

As the glitter material contained in the skin layer, it is preferable to use one or more kinds selected from the group consisting of mica, pearl mica, glass flake, aluminum powder, stainless powder, brass powder, metallic plating powder, metallic coating powder, aluminum flake, aluminum foil, zinc, and bronze powder. This leads to an advantage of an excellent glitter feeling.

It is particularly preferable to use a glitter material having a high transmittance with respect to a visible ray such as mica, pearl mica, glass flake, or the like. These materials further improve the glitter and color depth of the skin layer, and moreover, provide a color tone with high gloss, depth and glitter feel to the glitter resin molded material by light that has transmitted through the skin layer and reflected on the surface of the core layer which is colored with a coloring pigment.

The coloring pigment contained in the skin layer and the core layer is one or more kinds selected from a group of organic pigments such as phthalocyanine blue, cyanine green, indanthrene, azo, anthraquinone, perylene, perynone, quinacridone, isoindolinone, thioindigo, dioxazine; a group of inorganic pigments such as titanium oxide, titanium yellow, red iron oxide, burned pigment, carbon black; and a group of dyes such as phthalocyanine, anthraquinone, perylene, perynone.

Examples of the synthetic resin contained in the skin layer and the core layer are a single resin, such as polypropylene, polyethylene, polymethylpentene, polystyrene, AS(acryolonitrile-styrene resin), ABS(acrylonitrile-butadiene-styrene resin), AES(acrylonitrile-ethylene-styrene resin), AAS(acrylonitrile-acrylate-styrene), polyamide, acrylic, polycarbonate, polyacetal, PVC (polyvinyl chloride alcohol), PPO(polypropylene oxide), PET(polyethylene terephthalate), PBT(polybutylene terephthalate), ionomer; and a mixture of a plurality of synthetic resins such as polypropylene/polyamide, polycarbonate/ABS, polycarbonate/AES, PPO/polystyrene, polycarbonate/AAS, polycarbonate/PBT, polycarbonate/PET and the like.

Among them, polypropylene is most preferable from the viewpoint of moldability and cost.

When the synthetic resin for the core layer is polypropylene resin, an inorganic reinforcing agent, a bulking agent, a rubber component and the like are preferably added to the synthethic resin. This is because a suitable pliability can be provided to the resin molded material by adding the rubber component to the synthethic resin and a higher rigidity can also be provided thereto by an inorganic filler.

Examples of the inorganic reinforcing agent and the bulking agent are talc, mica, clay, silica, alumina, calcium carbonate, magnesium carbonate, zinc carbonate, calcium oxide, magnesium oxide, calcium hydroxide, magnesium hydroxide, aluminum hydroxide, calcium sulfate, barium sulfate, basic magnesium sulfate, calcium silicate, glass, calcium titanate and aluminate borate in the form of fiber, whisker, flake or powders.

Examples of the rubber are ethylene $\alpha$-olefin rubber such as EPM(ethylene-propylene rubber), EBM(ethylene-butene rubber), EOM(ethylene-octene rubber); styrene rubber such as SBR(styrene-butadiene rubber), SBS(styrene-butadiene-styrene resin), SIS(styrene-isoprene-styrene resin), SEBS (styrene-ethylene-butylenestyrene resin), SEPS(styrene-ethylene-propylene-styrene resin) and their hydrogen additives or the like.

According to the present invention, a blend may be directly molded in conjunction with the molding of the resin molded article, such that each component in the glitter resin molded material reaches the required amount in the final molded article. Alternatively, a compound can be prepared with an extruder, and this may be used for molding. Still further, a dry color or a master batch to be diluted with a resin for molding may be used.

Specific examples of molded articles made using the glitter resin molded material according to the present invention include, but are not limited to, plastic exterior parts for an automobile such as bumpers, side moldings and wheel caps; enclosures of office automation equipment or multimedia terminals such as personal computers, word processors, telephones and facsimiles; AV equipment such as VTR, TV, radio cassette recorders, audio amplifiers and speaker boxes; and housings or electric appliances such as refrigerators, laundry machines, vacuum cleaners, rice cookers, water heaters and coffee makers and the like.

EXAMPLES

A glitter resin molded material for each Example of the present invention and the Comparative Examples are explained hereinafter by referring to FIGS. 1 to 7.

Initially, as shown in Table 1, a raw material (raw materials SA, SB) for a skin layer and a raw material (raw materials CC, CD, CE) for a core layer were prepared.

The raw material for the skin layer was composed of homopolypropylene resin, pearl mica having an average particle size of 40 μm, burned yellow, carbon black and titanium oxide.

The raw material (raw materials CD, CE) for the core layer was formed by adding at least one type of coloring pigment selected from burned yellow, carbon black and titanium oxide to a composite polypropylene resin. The raw material (raw material CC) for the core layer was composed of composite polypropylene resin with no coloring pigment. The composite polypropylene resin included in the raw materials CC, CD, CE was composed of 60 wt % of block polypropylene resin, 30 wt % of ethylene-propylene rubber and 10 wt % of talc.

Next, as shown in FIG. 1, a surface of the core layer 3 was coated with the skin layer 2 by a sandwich molding machine using the raw material for the core layer and the raw material for the skin layer so that a side molding 9 for an automobile was molded. As shown in Table 2, the raw material for the core layer and the raw material for the skin layer were selected from the above-mentioned various types of raw materials shown in Table 1. A color difference ΔE* between the raw material for the skin layer and the raw material for the core layer and a thickness of the skin layer were varied. The side moldings thus obtained were designated as Examples 1 to 4 and Comparative Examples 1 to 3, respectively.

Next, evaluation of the outer appearances of these side moldings was performed by visual observation. As shown in Table 2, the evaluation items were the glitter feel and the color tone. The glitter feel was evaluated for a glaring feeling and a denseness. In these evaluations, a preferable case was indicated by O and a bad case was indicated by X. The color tone was evaluated from the outer difference between the sandwich molded article and the skin layer itself. A mark O indicates that the core layer did not greatly affect the sandwich molded article and the outer difference was not observable, and X indicates that the difference therebetween was conspicuous.

The production cost was also evaluated. The high production cost was indicated by "high", the average production cost was indicated by "average" and the low production costs was indicated by "low", respectively.

With respect to the CR value of the skin layer, the CR value was measured for sheets simply formed from each type of skin layer material.

The results of the measurements are shown in Table 2.

TABLE 1

| Kind of | Skin layer | | (Unit: weight ratio) Core layer | | |
|---|---|---|---|---|---|
| raw materials | SA | SB | CC | CD | CE |
| Synthetic resin | | | | | |
| Homopolypropylene | 100 | 100 | — | — | — |
| Composite polypropylene* | — | — | 100 | 100 | 100 |
| Coloring pigment | | | | | |
| Burned yellow | 0.01 | 0.01 | — | — | 0.01 |
| Carbon black | 0.005 | 0.005 | — | 0.1 | 0.005 |
| Titanium oxide | 0.1 | 0.1 | — | 0.1 | 0.1 |
| Glitter material | | | | | |
| Pearl mica | 1.5 | 3.0 | — | — | — |
| Color | Ivory pearl | Ivory pearl | Natural (pale) | Dark gray (dark) | Ivory (medium) |

Composite polypropylene*: block polypropylene/ethylene-propylene rubber/talc = 60/30/10

TABLE 2

| | Example 1 | Example 2 | Example 3 | Example 4 | Comparative Example 1 | Comparative Example 2 | Comparative Example 3 |
|---|---|---|---|---|---|---|---|
| Skin layer | | | | | | | |
| Grade | SA | SA | SA | SB | SA | SA | SA |
| Thickness (μm) | 0.3 | 0.8 | 1.5 | 0.3 | 3 | 0.3 | 2.5 |
| Kinds of core layer | CE | CE | CE | CE | — | CC | CD |
| Color difference ΔE* | 1 | 1 | 1 | 2 | 0 | 12 | 15 |
| Evaluation items | | | | | | | |
| Glitter feel | | | | | | | |
| Glaring feel | O | O | O | O | O | X | O |
| Denseness | O | O | O | O | O | O | O |
| Evaluation of Glitter feel | O | O | O | O | O | X | O |
| Color tone | O | O | O | O | O | X | O |
| Cost | Low | Low | Average | Average | High | Low | High |
| CR value | 66 | 82 | 95 | 75 | 99 or more | 66 | 99 or more |

With respect to the above evaluated results, a quality glitter feeling was obtained and the color tone was satisfactory in Examples 1 to 4. Especially, an exterior appearance having a further strengthened glitter feeling was particularly seen in Example 4 in which the amount of the glitter material used was large.

In contrast, in Comparative Example 1, the CR value was equal to or greater than 99 which resulted in low transparency and poor glitter feel. Moreover, since an expensive glider material was used in large quantities, the cost was increased.

In Comparative Example 2, a glaring feeling was lowered with an increased denseness and the glitter feel became dim.

In Comparative Example 3, the CR value was equal to or greater than 99% which resulted in low transparency and poor glitter feel. Moreover, since the thickness of the skin layer was thick and accordingly, an expensive glitter material was used in large quantities, the cost was increased.

The results of the above measurements will now be considered.

Figure 2:
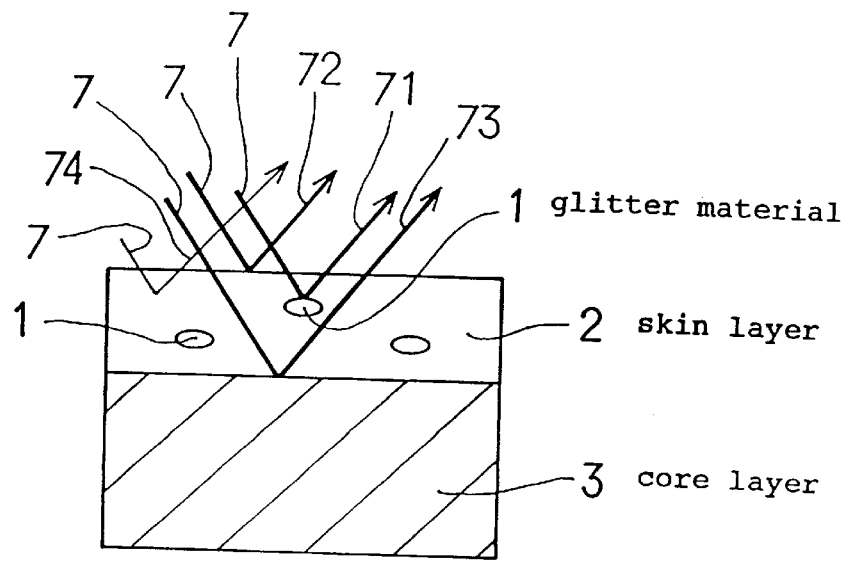
FIG. 2 is an explanatory illustration of Examples 1 to 4.

In Examples 1 to 4, as shown in FIG. 2, incident light 7 incident on the skin layer 2 is partially reflected on the glitter material 1 or a component (mainly a coloring pigment) of the skin layer 2 other than the glitter material. Further, the other portion of the incident light 7 reaches the core layer 3 through the skin layer 2. The light reaching the core layer 3 is reflected thereon (mainly a coloring pigment) and again passes through the skin layer 2. The glitter material reflecting light 71, pigment reflecting light 74, skin layer reflecting light 72 and core layer reflecting light 73 are visually recognized by a viewer.

In the Examples 1 to 4, the core layer 3 was colored in a color similar (stripped pearl mica therein) to the skin layer 2 so that both the layers were recognized as a compatibly integrated product. Therefore, the glitter feel was provided in these examples. Further, since the core layer 3 had an excellent impact resistance and rigidity, strength of the whole side molding was high.

Figure 3:
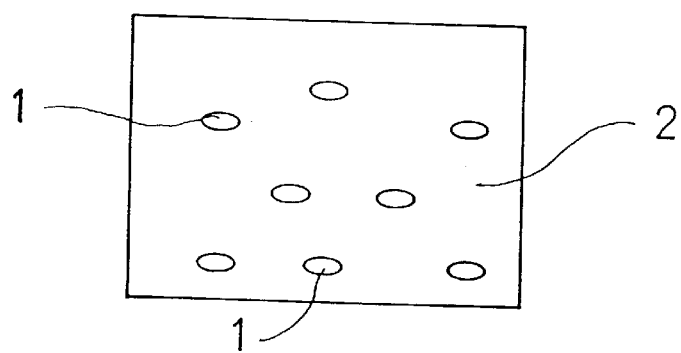
FIG. 3 is an explanatory illustration of Comparative Example 1.

In Comparative Example 1, as shown in FIG. 3, since the glitter resin molded material was formed of only the raw material of the skin layer 2, there was no affection of a color tone of the core layer and the exterior appearance was greatly affected by a color tone of the raw material of the skin layer 2. The skin layer 2 includes the glitter material 1 and has a simple layer color so that an excellent glitter feeling was provided. However, since the glider material 1 was used in large quantities, the production cost was increased. Further, impact resistance and rigidity were low since no raw material of the core layer was used.

Figure 4:
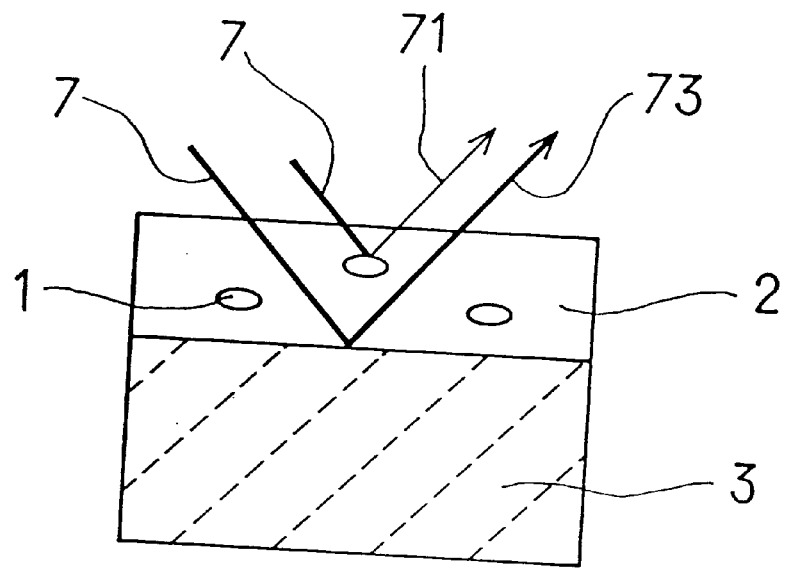
FIG. 4 is an explanatory illustration of Comparative Example 2.

In Comparative Example 2, as shown in FIG. 4, no coloring pigment was added to the core layer 3 so that it had a milk white color typical of composite polypropylene. Thus, incident light 7 that had passed through the skin layer 2 was reflected on the surface of the core layer 3 and this core layer reflecting light 73 was brighter. As a result, the glitter material reflecting light 71 faded and the glitter feel was deteriorated due to the core layer reflecting light 73.

Figure 5:
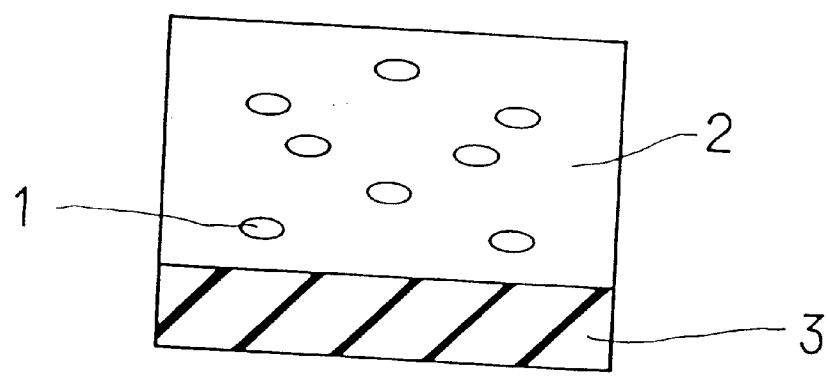
FIG. 5 is an explanatory illustration of Comparative Example 3.

In Comparative Example 3, as shown in FIG. 5, the light did not sufficiently reach to the core layer because of the thick skin layer although the color of the core layer was deeply colored. This led to the same effects as those of Comparative Example 1. Moreover, since the skin layer was thick, a great amount of the glitter material was required, resulting in an increased production cost. This thick skin layer also caused deterioration of impact resistance and rigidity.

As aforementioned, it is to be understood that a glitter molded material which has high "glitter feel and low cost can be obtained by setting the thickness of the skin layer 2 to in a range of 0.1 to 2 mm and a CR value thereof to less than 99%, and by coloring the core layer 3 with a coloring pigment.

EXPERIMENTAL EXAMPLE

In this example, the relation between the thickness of the skin layer and the CR value was evaluated.

The CR value of the skin layer was measured by the above-mentioned method using a molded sheet formed of a material of only the skin layer. The sheet used to measure the CR value was varied in thickness and color tone. The components of the sheet were variously changed by varying the kinds of coloring pigment and the glitter material therein with use of homopolypropylene described in Table 1. The sheet was composed of homopolypropylene, the coloring pigment and the glitter material described in Table 1. The color tone of the sheet was varied by changing the compounding proportion of the coloring pigment and the glitter material.

Figure 6:
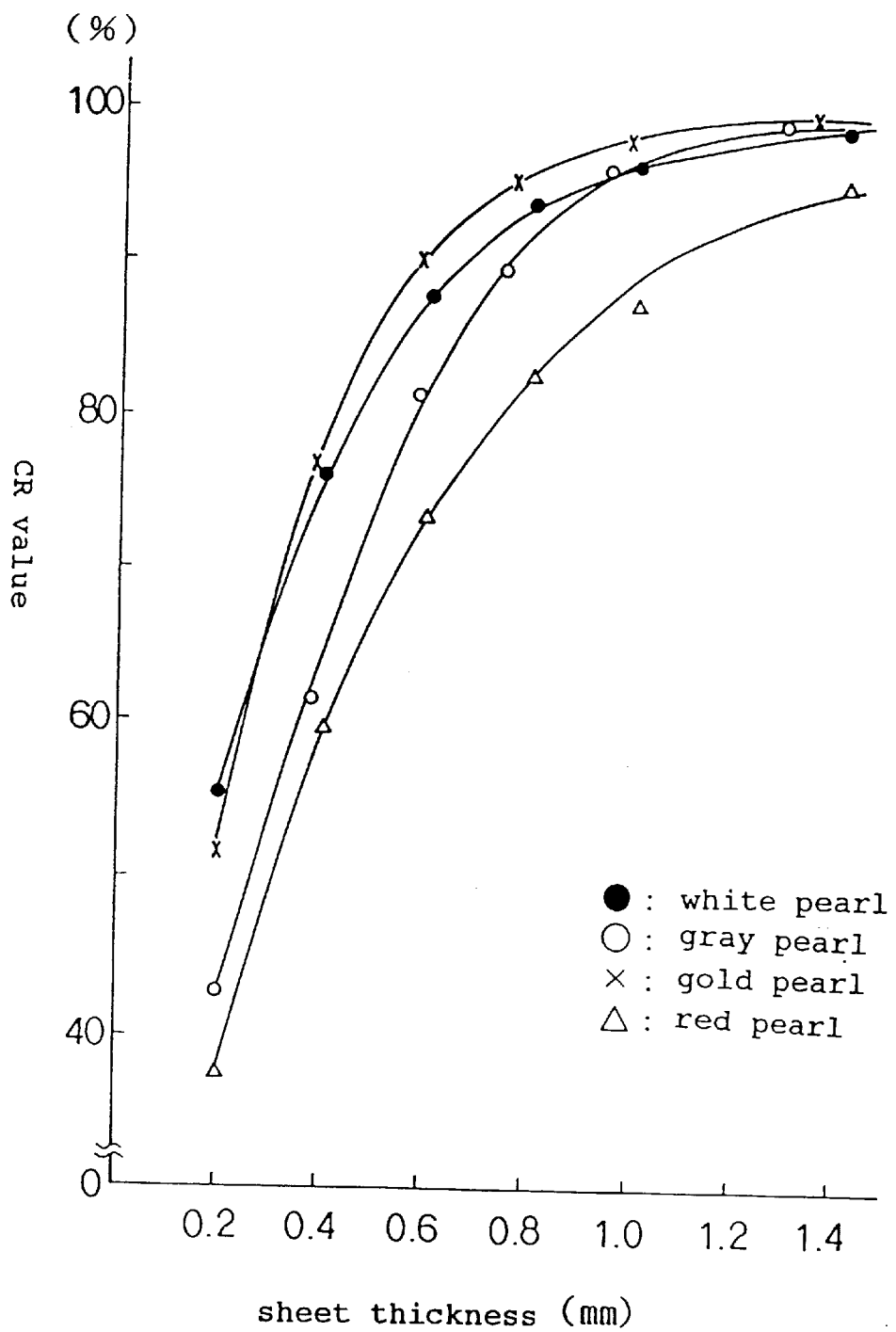
FIG. 6 is a diagrammatic illustration showing the CR values of the skin layer containing a color pigment of a pale color.
Figure 7:
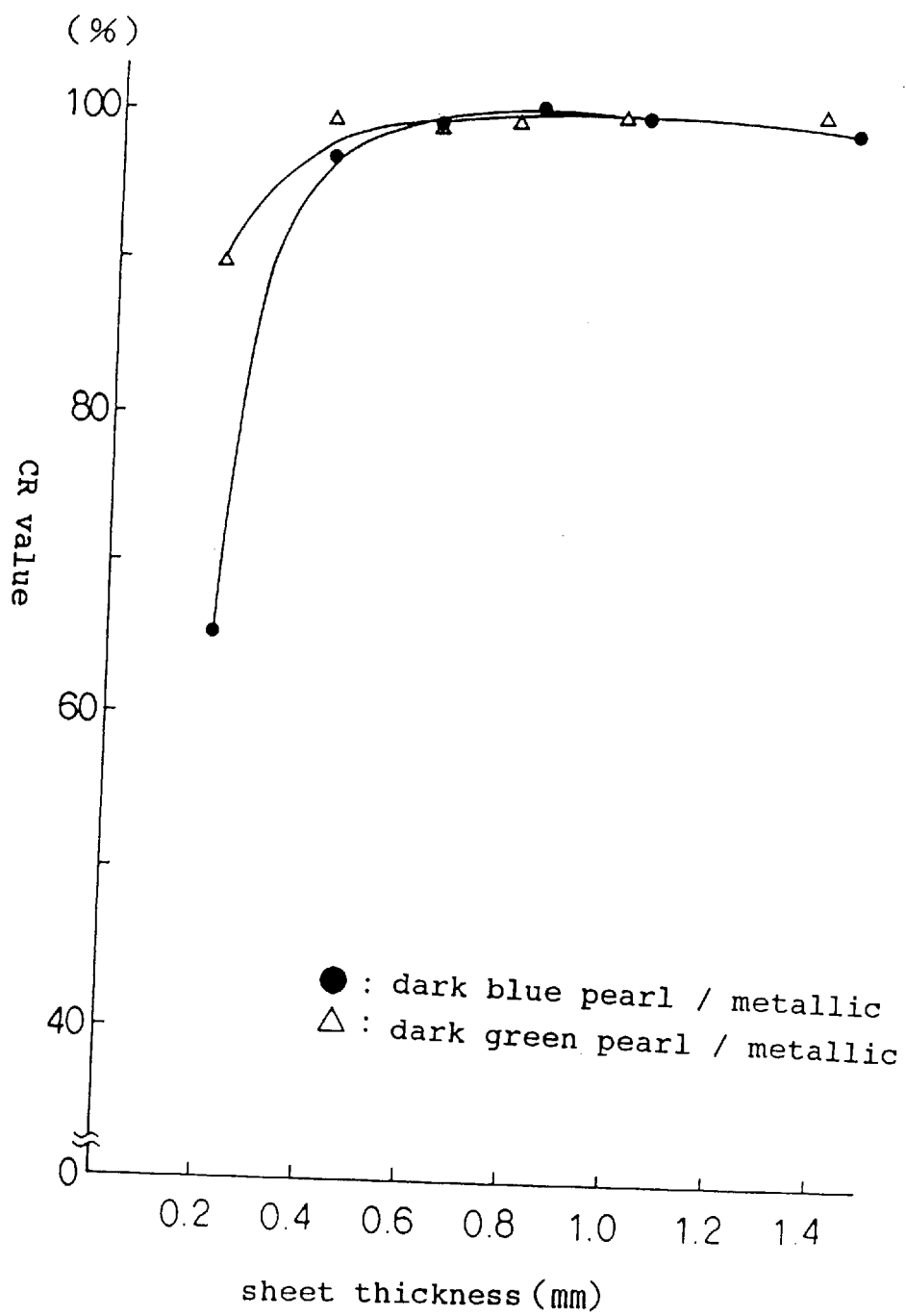
FIG. 7 is a diagrammatic illustration showing the CR values of the skin layer containing a color pigment of a dark color.

The results of the above measurements are shown in FIGS. 6 and 7. FIG. 6 shows a case in which the skin layer had a pale color tone and FIG. 7 shows a case in which the skin layer had a dark color tone.

It should be understood from these results that the CR value increases with the thickness of the sheet, namely, the thickness of the skin layer is increased. Further, the CR value in the dark color tone becomes nearly 100% at a thinner sheet thickness in comparison with the pale color tone.

When the skin layer is white pearl (pale color), the CR value became about 99% in the case where the skin layer had a thickness of about 1.5 mm (FIG. 6). In contrast to this, when the skin layer was dark green and pearl/metallic (dark color), the CR value became about 99% when the skin layer had a thickness of about 0.6 mm (FIG. 7).

As mentioned above, the CR value of the skin layer can be set to less than 99% by varying the thickness of the skin layer, by light and shade of the color tone of the skin layer and, accordingly, the transparency thereof can be adjusted.

Further, the CR value can also be adjusted by increasing and decreasing the added amounts of the coloring pigment and the glitter material.

The priority document JPA 17302/1997 filed Jun. 13, 1997 is incorporated herein in its entirety.

What is claimed is:

1. A glitter resin molded material comprising:
    a core layer comprising a synthetic resin and a color pigment; and
    a skin layer molded to a surface of said core layer, wherein said skin layer comprises a synthetic resin, a glitter material, and a color pigment, and wherein said skin layer has a contrast ratio (CR) value of less than about 99%,
    wherein a color difference $\Delta E^*$ between the skin layer and the core layer is about 10 or less.

2. The glitter resin molded material of claim 1, wherein the skin layer has a thickness in a range of about 0.1 to about 2 mm.

3. The glitter resin molded material of claim 1, wherein the CR value is less than 95%.

4. The glitter resin molded material of claim 1, wherein a color difference $\Delta E^*$ between the skin layer and the core layer is about 5 or less.

5. The glitter resin molded material of claim 1, wherein the glitter material transmits a visible ray therethrough.

6. The glitter resin molded material of claim 5, wherein the glitter material has a light transmittance of 1–99% with respect to the visable ray.

7. The glitter resin molded material of claim 1, wherein the glitter material comprises one or more materials selected from the group consisting of mica, pearl mica, glass flake, aluminum powder, stainless powder, brass powder, metallic plating powder, metallic coating powder, aluminum flake, aluminum foil, zinc, and bronze powder.

8. The glitter resin molded material of claim 1, wherein the color pigment in the skin layer and the core layer are one or more pigments selected from the group consisting of phthalocyanine blue, cyanine green, indanthrene, azo, anthraquinone, perylene, perynone, quinacridone, isoindolinone, thioindigo, dioxazine, titanium oxide, titanium yellow, red iron oxide, burned pigment and carbon black.

9. The glitter resin molded material of claim 1, wherein the synthetic resin in the skin layer and the core layer is selected from the group consisting of polypropylene, polyethylene, polymethylpentene, polystyrene, AS(acrylonitrile-styrene resin), ABS(acrylonitrile-butadiene-styrene resin), AES(acrylonitrile-ethylene-styrene resin, AAS(acrylonitrile-acrylate-styrene), polyamide, acrylic polycarbonate, polyacetal, PVC(polyvinyl chloride alcohol), PPO(polypropylene oxide), PET(polyethylene terephthalate) and PBT(polybutylene terephthalate), ionomer and the like.

10. The glitter resin molded material of claim 1, wherein the synthetic resin in the skin layer and the core layer is a mixture selected from the group consisting of polypropylene/polyamide, polycarbonate/ABS, polycarbonatet/AES, PPO/polystyrene, polycarbonate/AAS, polycarbonate/PBT and polycarbonate/PET and the like.

11. An article comprising the glitter resin molded material of claim 1.

12. The glitter material of claim 9, wherein when the synthetic resin in the core layer is polypropylene, one or more of inorganic reinforcing agent, a bulking agent, a rubber component and an inorganic filler are added.

13. The glitter resin molded material of claim 1, wherein said glitter material is embedded in said skin layer.

14. The glitter resin molded material of claim 1, wherein said glitter material is dispersed in said skin layer.

15. The glitter resin molded material of claim 1, wherein said glitter material is spaced apart in said skin layer.

16. The glitter resin molded material of claim 1, wherein said skin layer, said core layer and said glitter material reflect light.

17. The glitter resin molded material of claim 1, wherein the synthetic resin in the skin layer and the core layer is selected from the group consiting of polypropylene, polyethylene, polymethylpentene, polystyrene, AS(acrylonitrile-styrene resin), ABS(acrylonitrile-butadienestyrene resin), AES(acrylonitrile-ethylene-styrene resin, AAS(acrylonitrile-acrylate-styrene), polyamide, acrylic polycarbonate, polyacetal, PVC(polyvinyl chloride alcohol), PPO(polypropylene oxide), PET(polyethylene terephthalate) and PBT(polybutylene terephthalate), ionomer and the like or is a mixture selected from the group consisting of polypropylene/polyamide, polycarbonate/ABS, polycarbonate/AES, PPO/polystyrene, polycarbonate/AAS, polycarbonate/PBT and polycarbonate/PET and the like.

* * * * *